April 12, 1960     G. D. MILLIS     2,932,593
PROCESS FOR CLEANING PIPE LINES
Filed Nov. 25, 1957
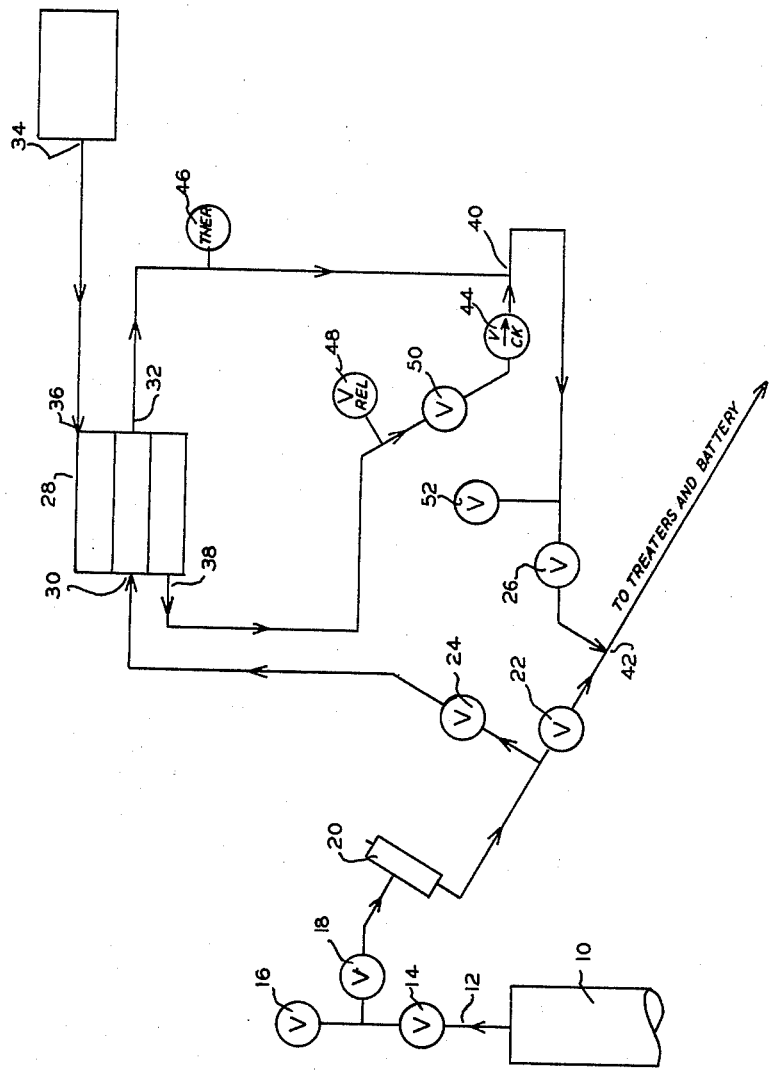
INVENTOR
GLENN D. MILLIS
ATTORNEY

United States Patent Office 2,932,593
Patented Apr. 12, 1960

2,932,593
PROCESS FOR CLEANING PIPE LINES

Glenn D. Millis, Laurel, Miss.

Application November 25, 1957, Serial No. 698,810

6 Claims. (Cl. 134—22)

This invention relates to a system or process for cleaning lines carrying crude oil flowing from an oil well to the treater and tank battery storage. It applies specifically to cleaning the pipe line extending from the Christmas tree at the head of the oil well to the treater usually located at the tank battery storage.

Difficulties have been encountered in the oil fields, where paraffin base oil is obtained from the oil wells. One of the problems is that as the oil temperature in the pipe line drops, the paraffin crystallizes out of the oil and the paraffin particles adhere to the walls of the pipe line. Over a period of time the adhered paraffin will gradually close and clog the pipe line and stop the flow of oil. As an illustration, it is not unusual for 2-inch pipe lines to close from the paraffin to such a degree that only ⅛ inch flow remains in the line.

In order to keep the pipe line free from the clogging effects of the paraffin adhered to the walls of the pipe, different methods have been used to open the lines with varying degrees of success. One method utilizes injection of steam into the flow of oil from the well, but in cases where the distance from the well head to the treaters is greater than a few hundred feet, difficulty has been encountered in that the steam condensed and would not be effective. Another method which has been practiced is to inject oil heated by burners mounted on trucks into the flow of oil coming from the well. This has been satisfactory to some degree, but it is somewhat expensive. This latter method also is dangerous due to a source of fire near the well head.

It is therefore an object of the present invention to utilize an improved method for cleaning oil pipe lines which have accumulated paraffinic materials on the inner walls of the pipe.

It is a further object to utilize a method for cleaning oil pipe lines in which the source of heat which generates steam to treat the oil and the pipe lines is remote from the line and the well head, thus removing the additional hazard of fire around high pressure wells and the highly inflammable crude oil.

An additional object is to remove paraffinic materials from the walls of oil pipe lines through use of heated oil mixed with steam and hot water.

A further object is to remove paraffinic materials from oil pipe lines using well pressure to flow the heated oil, water and steam through the pipe line thus removing the paraffin adhered to the side walls of the pipe.

Another object is to arrange an apparatus which is portable to accomplish the objects outlined in the preceding paragraphs.

Additional objects will be obvious to those using the apparatus and method of the invention described and claimed herein.

Broadly stated, the present invention comprises heating oil by means of steam in a heat exchanger, mixing the exhaust steam and hot water flowing from the heat exchanger with the previously heated oil, and passing the mixed hot oil, steam and water through the pipe line which has paraffinic material collected on the walls thereof, the hot mixed liquid being moved in the pipe line by the pressure from the oil well. The maximum temperature of the hot mixture should not exceed about 300°–320° F., otherwise the pipe coating on the lines may be softened and damaged. However, since paraffin melts around 140°–150° F., the paraffin adhered to the walls of the pipe line will melt at the temperatures of the oil, steam and water mixture and thus be washed from the line.

Describing the invention with reference to the accompanying drawing, crude oil flows from oil well 10 under pressure into the system of pipes 12. The flow of the oil is controlled at the head of the well by means of a group of valves identified in the drawing by numerals 14, 16 and 18. Such a group of valves in addition to other equipment not shown, are generally referred to as a Christmas tree. With valve 16 closed, and valves 14 and 18 open, the oil flows under well pressure through a choke 20 which is used to regulate the flow of oil in the pipe line beyond the choke.

In flowing oil under pressure to the treaters and/or tank storage, which are located at varying distances from the well, normally the valves 24 and 26 are closed and valve 22 is open. The oil flowing from the well is quite warm, and usually in the shorter flow lines, the oil does not chill sufficiently for the paraffin, which melts around 140° F., to crystalize and deposit on the inner walls of the pipe line. However, as the length of the flow line is increased, the warm oil will cool and the paraffin will crystalize and deposit on the walls of the pipe and in a short time the pipe will become clogged and impede the flow of oil.

When the flow of oil is impeded, valve 22 is closed, and valves 24 and 26 are opened. The oil will then flow through heat exchanger 28 by entering at inlet 30 and leaving the exchanger at 32. As the oil passes through heat exchanger 28, steam generated by boiler 34 enters the heat exchanger at inlet 36 and exhausts from the unit at 38. The amount of steam pressure used is dependent upon the temperature to which it is desired to heat the oil in the line. In passing through the heat exchanger, the oil will become heated but it is desirable that the oil should preferably not be heated above about 240° to 260° F. for average operations. In severely blocked lines, and in the case of long distances between the well and the treaters, higher temperatures may be used but should not exceed 300°–320° F. For shorter lines, lower temperatures may be used, but for economical operations in such shorter lines the temperature of the heated oil should not be below about 180°–200° F. to obtain efficient melting and flushing of the paraffin from the pipe line.

The exhaust steam from the heat exchanger 28 is then injected into the flow line at 40 so that the hot oil and the exhausted steam and hot water are thoroughly mixed in the pipe line. The mixture of hot oil, steam and hot water then flows through valve 26 and into the main pipe line at 42. Since valve 22 is closed the hot liquid mixture will move into the pipe line portion leading toward the treaters and tank battery. The hot liquid mixture will gradually melt the occluded paraffin from the walls of the pipe line. When the paraffin has been melted from the walls of the pipe, 24 and 26 are closed and valve 22 is opened. The process described is repeated as often as necessary in order to keep the pipe line free from the occluded paraffin on the walls of the pipe.

A check valve 44 is provided in the exhaust steam line from the heat exchanger 28 so that the heated oil cannot flow back into the heat exchanger.

As an example from actual operations in order to illustrate the process, an oil well that is flowing 150 barrels a day would have about 4½ gallons of oil per minute through the heat exchanger, and with 2,000 feet of flowline, would require dry steam of about 175 pounds per square inch pressure to give the desired temperature of about 260° F. to remove the paraffin from the oil lines without damage to pipe coatings. In case the well is flowing 300 barrels per day in such a 2,000 foot line, dry steam pressure of about 400 pounds per square inch should be maintained in the heat exchanger to maintain the temperature of about 260° F. in the heated oil to accomplish the optimum results. It should be obvious that the longer the flowline, the more steam and hot water will be necessary to carry the heated oil to the treater and tanks.

Another example to illustrate the operation in connection with a longer flow line, viz. 11,000 feet length, in which 2,000 feet of the line was under water, 5,000 feet above ground and 4,000 feet across marsh land, in this case it was necessary to heat the oil to 300° F. in order to obtain the desired temperature in the flow line to properly melt and wash the material from the flow line. In the operation, the well was flowed on a 3/16 inch choke for 30 minutes and then increased to a 3/8 inch choke for 15 minutes to obtain the desired temperature in the flow line. In comparing this operation with previous operations for cleaning the pipe line, previously the job required several separate operations, that is, steaming and flowing the well into burn pits along the line which wasted approximately 200 barrels of oil per day and required 48 hours for completing the cleaning job. In following the method of the present invention, the cleaning job was done in about 6 hours and with no waste of oil since no crude oil need be drained into burn pits.

The hot water and steam mixed with the heated oil have a beneficial flushing action in removing the paraffin. The water and steam will be removed from the oil in a subsequent step in the oil treating operation, but this does not form any part of my invention.

Various gauges and valves as temperature gauge 46, safety valve 48, blending valve 50 and bleed off valve 52 are shown in the drawing and are used as needed in operation of the procedure described herein as my invention.

As many apparently widely different embodiments and changes in the process of this invention may be made without departing from the spirit and scope thereof, it is to be understood that the invention is not to be limited to the specific procedural steps thereof except as defined in the appended claims.

I claim:

1. The method for cleaning paraffin adhered to the walls of the flow lines carrying oil from the well to the treater and storage, which comprises heating oil flowing from the well under well pressure, mixing hot water and steam with the heated oil in the flow line carrying the heated oil, and forcing the hot mixture of hot oil, steam and hot water through the flow line to be cleaned.

2. The method for cleaning paraffin adhered to the walls of the flow lines carrying oil from the well to the treater and storage, which comprises heating the oil flowing from the well under pressure to a temperature within the range of 240° and 260° F., mixing hot water and steam with the heated oil in the flow line carrying the oil, and moving the mixture of hot oil, steam and hot water through the flow line having paraffin adhered to the walls thereof.

3. The method for cleaning paraffin adhered to the walls of flow lines carrying oil from the well to the treater and storage, which comprises heating the oil flowing from the well under pressure to a temperature within the range of 180° and 260° F., mixing hot water and steam with the heated oil in the flow line carrying the oil, and moving the mixture of hot oil, steam and hot water through the flow line having paraffin adhered to the walls thereof.

4. The method for cleaning paraffin adhered to the walls of flow lines carrying oil from the well to the treater and storage, which comprises moving oil flowing from the well under well pressure through a circuitous path in a closed chamber and simultaneously heating the oil with steam, mixing the steam and hot water obtained from condensation of steam exhausted from the chamber with the hot oil in the flow line, and moving the mixture of hot oil, steam and hot water through the flow line having paraffin adhered to the walls thereof.

5. The method for cleaning paraffin adhered to the walls of flow lines carrying oil from the well to storage as defined in claim 4, and wherein said oil is heated to a temperature between 240° and 260° F.

6. The method for cleaning paraffin adhered to the walls of flow lines carrying oil from the well to storage as defined in claim 4, and wherein said oil is heated to a temperature within the range of 180° and 320° F.

References Cited in the file of this patent

UNITED STATES PATENTS

| | | |
|---|---|---|
| 1,198,045 | Miller | Sept. 12, 1916 |
| 2,023,496 | Todd | Dec. 10, 1935 |
| 2,076,847 | Johnston | Apr. 13, 1937 |
| 2,576,843 | Lockman | Nov. 27, 1951 |